(12) United States Patent
Allen

(10) Patent No.: US 12,528,221 B2
(45) Date of Patent: Jan. 20, 2026

(54) DIE MACHINE AND DRIVE MEMBER INSTALLED THEREON

(71) Applicant: DICAR INC., Pine Brook, NJ (US)

(72) Inventor: Lance Joseph Allen, Spring, TX (US)

(73) Assignee: DICAR INC.

(*) Notice: Subject to any disclaimer, the term of this patent is extended or adjusted under 35 U.S.C. 154(b) by 348 days.

(21) Appl. No.: 18/030,843

(22) PCT Filed: Dec. 10, 2020

(86) PCT No.: PCT/US2020/064355
§ 371 (c)(1),
(2) Date: Apr. 7, 2023

(87) PCT Pub. No.: WO2022/125106
PCT Pub. Date: Jun. 16, 2022

(65) Prior Publication Data
US 2023/0381997 A1    Nov. 30, 2023

(51) Int. Cl.
*B26D 7/20* (2006.01)
*B26F 1/38* (2006.01)
(Continued)

(52) U.S. Cl.
CPC .............. *B26D 7/204* (2013.01); *B26F 1/384* (2013.01); *B26F 1/44* (2013.01); *B32B 5/18* (2013.01);
(Continued)

(58) Field of Classification Search
CPC . B26F 1/44; B26F 1/384; B32B 15/18; B32B 5/18; B32B 7/08; B32B 7/05;
(Continued)

(56) References Cited

U.S. PATENT DOCUMENTS 3,537,632 A    11/1970   Watson
3,739,675 A *  6/1973   Duckett ................... B26D 7/20
                                                        83/347
(Continued)

FOREIGN PATENT DOCUMENTS

JP    2018505068 A    2/2018
WO   2015175626 A1   11/2015

OTHER PUBLICATIONS

International Search Report and Written Opinion dated Mar. 10, 2021 received in PCT/US2020/064355, pp. 1-8.
(Continued)

*Primary Examiner* — Ghassem Alie
(74) *Attorney, Agent, or Firm* — Zhong Law, LLC

(57) ABSTRACT

A drive member for driving a sheet of workpiece through a die machine including a backing layer including a first surface defined in a first dimension by a first width and defined in a second dimension by a first length and a padding layer comprising a first surface defined in the first dimension by a second width and defined in the second dimension by a second length, where the padding layer is composed of a compressible foam material. In an uncompressed state of the padding layer, the second length of the padding layer is longer than the first length of the backing layer, and in a compressed state of the padding layer, the padding layer is compressed along the second dimension to match the first length of the backing layer, and the first surface of the padding layer is bonded to the first surface of the backing layer.

20 Claims, 5 Drawing Sheets

(51) Int. Cl.
*B26F 1/44* (2006.01)
*B32B 5/18* (2006.01)
*B32B 7/02* (2019.01)
*B32B 15/04* (2006.01)
*B32B 15/18* (2006.01)
*B32B 25/04* (2006.01)

(52) U.S. Cl.
CPC .............. *B32B 7/02* (2013.01); *B32B 15/046* (2013.01); *B32B 15/18* (2013.01); *B32B 25/045* (2013.01); *B32B 2250/02* (2013.01); *B32B 2307/7375* (2023.05)

(58) Field of Classification Search
CPC .......... B32B 3/30; B32B 7/02; B32B 25/045; B32B 15/046; B32B 2266/0278; B32B 2250/02; B32B 2307/7375; B32B 2266/0207; B32B 27/40; B26D 7/204; B26D 1/40; B26D 7/20; B26D 2007/202; B29C 70/228; B29C 70/36; Y10T 83/19312; Y10T 83/4841; Y10T 83/04
USPC .......... 83/492, 659, 347, 658; 492/40, 45, 48
See application file for complete search history.

(56) References Cited

U.S. PATENT DOCUMENTS

| | | | | |
|---|---|---|---|---|
| 3,765,329 A * | 10/1973 | Kirkpatrick | ......... | B41F 27/1262 101/415.1 |
| 3,775,821 A | 12/1973 | Somerville | | |
| 3,885,486 A * | 5/1975 | Kirkpatrick | ......... | B41F 27/1281 83/659 |
| 4,848,204 A * | 7/1989 | O'Connor | ................ | B26D 7/20 101/415.1 |
| 5,076,128 A * | 12/1991 | O'Connor | ................ | B26D 7/20 101/415.1 |
| 6,135,002 A * | 10/2000 | Neal | ................ | B26D 7/20 83/13 |
| 6,435,069 B1 * | 8/2002 | Kirkpatrick, Jr. | ....... | B29C 41/20 83/698.42 |
| 6,889,587 B2 * | 5/2005 | Neal | ................ | B26D 7/20 83/347 |
| 7,007,581 B2 * | 3/2006 | Elia | ................ | B26D 7/20 83/347 |
| 7,476,191 B2 * | 1/2009 | Putch | ................ | B65H 27/00 493/369 |
| 10,836,064 B2 * | 11/2020 | Borges Fernandez | | B26D 7/204 |
| 2002/0088328 A1 * | 7/2002 | Porcella | ................ | B26D 7/20 83/347 |
| 2003/0041714 A1 * | 3/2003 | Neal | ................ | B26D 7/20 83/347 |
| 2003/0138620 A1 | 7/2003 | Fonseca | | |
| 2007/0082798 A1 | 4/2007 | Putch et al. | | |
| 2018/0207829 A1 * | 7/2018 | San Filippo | ........... | B32B 27/12 |

OTHER PUBLICATIONS

Dicar Inc., "SpeedStrap: Full Wrap Magnetic Pull Band," Linkedin, Sep. 2020, pp. 1-4.
Notice of Reasons for Refusal received for Japanese Patent Application No. 2023-535432, mailed on Nov. 18, 2024.

* cited by examiner

DIE MACHINE AND DRIVE MEMBER INSTALLED THEREON

CROSS-REFERENCE TO RELATED APPLICATIONS

This application is the U.S. national stage of PCT/US2020/064355 filed Dec. 10, 2020, the content of which is hereby incorporated by reference in its entirety.

TECHNICAL FIELD

This disclosure relates to die machine, in particular to relating to a die machine and one or more drive members installed thereon for driving a sheet of workpiece through the gap between a pair of rotating cylinders of the die machine.

BACKGROUND

Die machines are widely used in forming a product from sheets of workpiece. The product can be a box, and the sheets of workpiece can be corrugated cardboards that may undergo several processing sections of a production line including, for example, slitting, scoring, printing, and die cutting sections.

BRIEF DESCRIPTION OF THE DRAWINGS

The present disclosure is illustrated by way of example, and not by way of limitation, in the figures of the accompanying drawings.

DETAILED DESCRIPTION

Figure 1A:
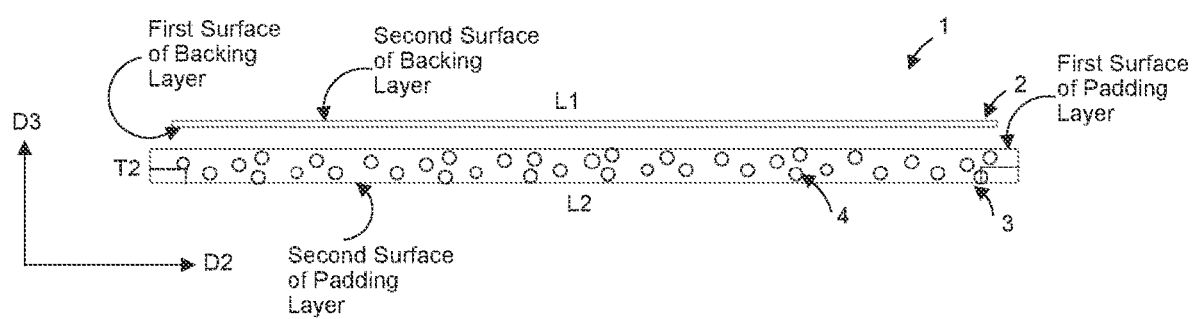
FIGS. 1A-1B illustrate two views of components of a drive member according to an implementation of the disclosure.

Using the cardboard box as an example, the production line of the cardboard box may include several processing sections for performing, for example, slitting, scoring, printing, and die cutting operations. Each processing section may include one or more machines that may be installed with different types of tooling to perform one or more of slitting, scoring, printing, or die cutting operations.

The die machine may include a pair of cylinders that are stacked up in a close proximity with a gap between the top cylinder and the bottom cylinder, where the gap allows a sheet of workpiece to pass through during a processing operation. The die machine may include one or more motors that, during operation, may drive the pair of cylinders to rotate in opposite directions-namely, when observed from the side facing the cross-section of the cylinders, one cylinder rotates clockwise while the other cylinder rotates counter-clockwise. The pair of cylinders may include a die cylinder installed thereon with the tooling. Depending on the operation the die machine may perform, the tooling installed on the die cylinder can be cutting knives or scoring rules. The pair of cylinders may further include an anvil cylinder installed thereon with one or more anvil pads made of soft materials to provide a cushion to the tooling during processing the sheets of workpiece. During a processing operation, a sheet of workpiece may be fed into the gap between the two cylinders. The opposite-direction rotation motions of the two cylinders may drive the sheet of workpiece through so that the tooling installed on the die cylinder may perform the slitting, scoring, or die cutting operation while the sheet is being fed through the die machine.

The machines (e.g., print machines, slot machines, die cut machines) in the processing sections of the production line may be operated to sequentially process a sheet of workpiece such as a cardboard, a plastic sheet, a corrugated board etc. In some implementations, the production line may be utilized to produce different types of products. Certain products may require only some but not all of the processing steps available in the production line. Thus, to produce a product, the tooling of certain die machines in the production line may need to be uninstalled or removed so that these die machines make only dummy runs. In a dummy run, the die machine does not perform any of the slitting, scoring, and die cutting operations, and does not cause any modification to the sheet of workpiece. The purpose of dummy runs is to move the sheet of workpiece to the next die machine in the production line. The removal of the tooling from a die machine may leave a wide gap between the lowest contour line of the die cylinder and the highest contour line of the anvil cylinder. The gap between the die cylinder and the anvil cylinder without the tooling installed on the die cylinder can be so wide that the surface of the die cylinder does not touch the sheet of workpiece and cannot generate a frictional drive force to drive the sheet of workpiece through the die machine in the dummy run. In such situation, one or more drive members (also referred to as "speed strap") may be installed in place of the tooling. The thickness of the drive member may reduce the gap between the die cylinder and the anvil cylinder, thus generating the frictional force on the sheet of workpiece to drive it through the die machine in the dummy run.

A drive member (or speed strap) in this disclosure refers to a pliable mechanical part that has a certain thickness and can be securely installed onto a cylinder of a die machine to reduce the gap space between the cylinder and another cylinder of the die machine so that when a sheet of workpiece is fed into the gap between the two cylinders, the drive member may make direct contact with the surface of the sheet of workpiece and generate a frictional force on the surface of the sheet to drive the sheet through the rotational motions of the two cylinders. The driver member may include one or more layers of pliable material including an inner surface to contact the cylinder (e.g., the die cylinder) and an outer surface of soft and frictional material that can generate sufficient frictional force during operation to drive the sheet of workpiece.

In current implementations, the speed straps may include a layer of foam material having a thickness (e.g., about 0.75 inches) and a backing layer of magnetic material, where the layer of foam material may be bonded to the backing layer. The foam material in this disclosure refers to a class of solid cellulous structure that includes pockets of air (or air bubbles) trapped therein. The foam material may be soft, and the size of the foam material may be compressible due to its softness and the pockets of air trapped therein. In its natural state where no man-made, external forces exerted on a piece of foam material (where the external forces exclude the gravity), the piece of foam material may have a definitive volume. For example, a cuboid of foam material may be defined by a width in a first dimension, a length in a second dimension, and a thickness in a third dimension. The compressibility of the foam material means that the shape of the foam material may be reduced or expanded from any one of the three dimensions due to external forces exerted on the foam material. When the foam material is expanded, the softness on the surfaces of the foam material may be reduced.

The layer of foam material may be bonded to the backing layer using an adhesive agent (e.g., glue) to form the drive member. The drive member may be bent so that its inner surface conforms with the surface of the die cylinder, where when bent, the backing layer is the inner layer bound to the die cylinder by magnetic force, and the foam layer is the outer layer that provides a soft and frictional surface for driving the sheet of workpiece. Current implementations of drive members may add rigidity to the foam layer when the drive member is bent because the foam layer is stretched along its outer surface from its natural state. During operation, the added rigidity may create a counter force that opposes the magnetic force binding the backing layer to wrap around the die cylinder. This increased counter force may overcome the magnetic binding force between the magnetic backing layer and the die cylinder, causing the drive member susceptible to be disengaged from the die cylinder when the cylinders are rotating and the sheet of workpiece is fed through the die machine. Sometimes, the production line may experience an overflow or a jam in the downstream machines. The pile up of the sheets of workpiece may stop the current die machine in the dummy run from pushing through the sheet of workpiece, causing disengagement of the drive member from the die cylinder. Also, when the die cylinder rotates at higher than normal rotational speed, it may also generate a centrifugal force which also counters the magnetic force on the driver member, causing disengagement of the driver member from the die cylinder. Here, the centrifugal force refers to an apparent force that separately acts outward on the surface of the drive member around the central axis of the die cylinder, arising from the inertia of the drive member and the die cylinder.

Another issue with the current implementations of drive members is that they do not wrap all the way around the die cylinder. This type of designs makes it more difficult to time the contact between the driver member and the sheet of workpiece as it passes through the die machine. The timing of the die machine requires to be precise in order for the drive member to make contact with the sheet of workpiece and drive the sheet forward. To compensate for this deficiency, two drive members positioned 180° from each other may be required on the die cylinder to ensure the contact between the sheet of workpiece with at least one of the two drive members.

U.S. Pat. No. 7,476,191 discloses a "Die Cutting/Scoring Apparatus Sheet Material Driving Member" including an engagement member with teeth for frictional engagement. The teeth, however, cost more to mold during manufacture of the engagement member and thus significantly increase the production cost for the engagement member.

To overcome the above-identified and other deficiencies of current versions of drive members, implementations of the disclosure provide for a drive member (or speed strap) for driving a sheet of workpiece through a die machine. The implementation of the drive member according to the disclosure may include a backing layer including a first surface defined in a first dimension by a first width and defined in a second dimension by a first length, and a padding layer including a first surface defined in the first dimension by a second width and defined in the second dimension by a second length, where the padding layer is composed of a compressible foam material. In one implementation, in an uncompressed state of the padding layer, the second length of the padding layer is longer than the first length of the backing layer, and in a compressed state of the padding layer, the padding layer is compressed along the second dimension to match the first length of the padding layer, and the first surface of the backing layer is bonded to the first surface of the padding layer.

In one implementation, the backing layer is composed of a sheet of one of magnetic steel or magnetic rubber, and wherein the padding layer is composed of one of natural rubber or synthetic rubber including at least one of polyurethane, ethylene propylene diene monomer (EPDM), polychloroprene (neoprene), or blended flexible compound synthetic rubber.

In one implementation, in the uncompressed state, the padding layer is in a natural state without receiving an external force to compress or expand the padding layer along the second dimension of the padding layer.

In one implementation, in the uncompressed state prior to bonding to the backing layer, the padding layer is substantially flat, where in the compressed state in which the padding layer is bonded to the backing layer, the padding layer and the backing layer are curved with the backing layer providing an inward layer and the padding layer providing an outward layer of the drive member.

In one implementation, the backing layer may include a second surface that is matched to and substantially parallel to the first surface of the backing layer, where the padding layer may include a second surface that is matched to and substantially parallel to the first surface of the padding layer, and a thickness of the padding layer is defined as a distance between the first surface and the second surface of the padding layer.

In one implementation, the padding layer is terminated along the second dimension by a first end surface and a second end surface, where the padding layer may include a first recess channel with an outlet to the first end surface, and a second recess channel with an outlet to the second end surface.

In one implementation, the drive member may further include a fastener device comprising a tab fixedly attached in the first recess channel and a hook device fixedly attached in the second recess channel, where when the drive member is bent so that the first end surface and the second end surface meet, the outlet of the first recess channel is to match the outlet of the second recess channel.

In one implementation, when the drive member is bent so that the first end surface and the second end surface meet, the tab is secured onto the hook device so that the second surface of the backing layer forms a curved surface that matches to a die cylinder of the die machine.

In one implementation, the thickness of the padding layer is uniformly identical at any point on the first surface or the second surface of the padding layer except for areas defining the first recess channel and the second recess channel.

In one implementation, the second surface of the padding layer is smooth and frictional.

In one implementation, in the uncompressed state of the padding layer, the second length of the padding layer is at least two (2) percent longer than the first length of the backing layer.

Implementations of the disclosure provide a die machine including a motor, an anvil cylinder, and a die cylinder installed thereon with the drive member as specified according various implementations of the drive member. In one implementation, the motor is activated to drive the anvil cylinder and the die cylinder to rotate in opposition directions, where the sheet of workpiece is provided to a gap between the rotating anvil cylinder and the rotating die cylinder installed thereon with the drive member, and the second surface of the padding layer of the drive member is to contact the sheet of workpiece and a frictional force generated by the second surface of the padding layer of the driver member is to drive the sheet of workpiece through the die machine without causing modification to the sheet of workpiece.

Figure 1B:
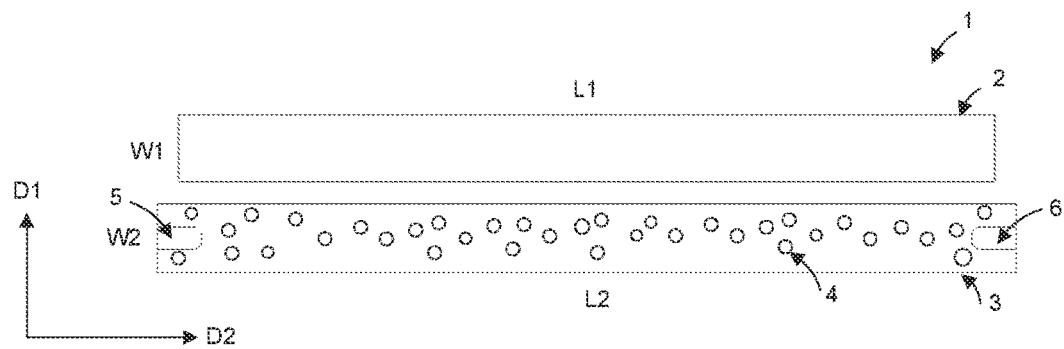

FIGS. 1A-1B illustrate two views of components of a drive member 1 according to an implementation of the disclosure. The drive member can be a speed strap that may be used to wrap around the circumferential surface of a die cylinder of a die machine for driving a sheet of workpiece through the die machine during a dummy run. The dummy run does not cause any modification to the sheet of workpiece other than moving to the sheet to a next machine or processing section.

Referring to FIGS. 1A-1B, driver member 1 may include a backing layer 2 and a padding layer 3. FIG. 1A is a side view of backing layer 2 on top of padding layer 3, and FIG. 1B is a top view of backing layer 2 and padding layer 3. In one implementation, backing layer 2 can be a thin layer of pliable, magnetic material that can be bent to conform the surface of a die cylinder (not shown) of a die machine. For example, the thin layer of pliable, magnetic material can be a sheet of magnetic steel or magnetic rubber. In one implementation, backing layer 2 can be a rectangular sheet including a first surface area and a second surface area, each of the first and second surface areas being defined in a first dimension (D1) by a first width (W1 inches) and in a second dimension (D2) by a length (L1 inches). The first surface of backing layer 2 faces padding layer 3 when padding layer 3 is bonded to backing layer 2; the second surface of backing layer 2 contacts the die cylinder when drive member 1 wraps around the die cylinder.

Padding layer 3 may be composed of a compressible foam material. The foam material, as defined above, refers to a class of solid cellulous structure that includes pockets of air (or air bubbles 4) trapped therein. Examples of foam material may include, but not limited to, one of natural rubber or synthetic rubber including at least one of polyurethane, ethylene propylene diene monomer (EPDM), polychloroprene (neoprene), or blended flexible compound synthetic rubber. The total number of air bubbles 4 trapped in the padding layer once the padding layer is manufactured can be a fixed amount. Thus, in its natural uncompressed state, padding layer 3 may occupy a certain volume (v1) with an air bubble density (d1), where the air bubble density is defined as the average number of air bubbles per unit volume (or the total number of air bubbles 4 in padding layer 3 divided by the volume occupied by padding layer 3). When padding layer 3 is compressed by external forces from any direction, the volume of padding layer 3 may be reduced to a smaller volume (v2) while the air bubble density may increase to a higher density value (d2).

In one implementation, in its natural uncompressed state, padding layer 3 may have a cuboid shape that can be defined in the first dimension (D1) by a second width (W2 inches), in the second dimension by a second length (L2 inches), and in a third dimension by a second thickness value (T2 inches). Thus, the volume of padding layer 3 can be W2×L2×T2 cubic inches. As such, padding layer 3 may include a first surface area and a second surface area each being defined in the first dimension by the second width (W2 inches) and in the second dimension by the second length (L2 inches). The first surface area of padding layer 3 faces and touches the first surface area of backing layer 2 when padding layer 3 is bonded to backing layer 2; the second surface area of padding layer 3 is exposed to outside when drive member is wrapped onto the die cylinder to provide the frictional surface to the sheet of workpiece passing through the die machine.

In one implementation, in its natural uncompressed state prior to bonding padding layer 3 to backing layer 2, the second length value (L2 inches) of padding layer 3 is longer than the first length value (L1 inches) of backing layer 2. The longer padding layer 3 may allow the compression of padding layer 3 to a length matching the length of backing layer 2 when padding layer 3 is bonded to backing layer 2. Padding layer 3 in the compressed state may have a less rigid outer surface. Thus, such produced drive member 1 may generate less counter force to ensure a more secure bonding between drive member 1 and the die cylinder during operation, thus reducing the chance of drive member 1 to fall off the die cylinder.

Figure 2:
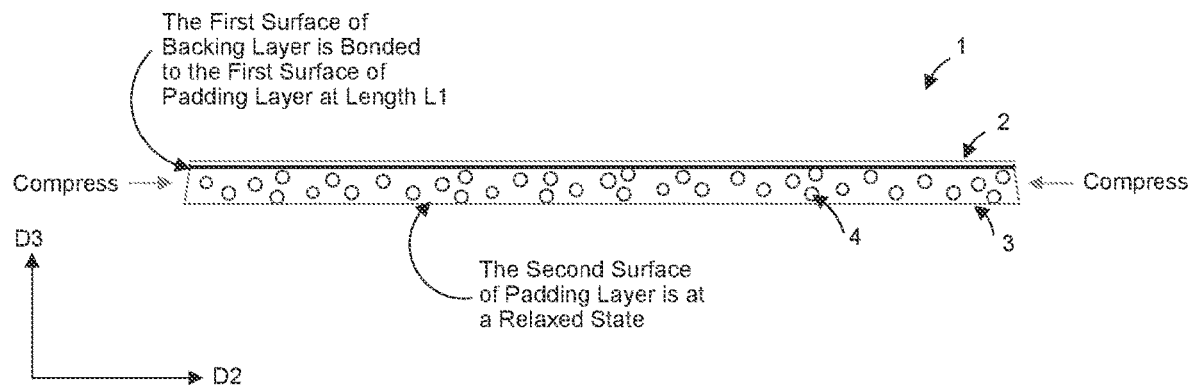
FIG. 2 illustrates a drive member including a backing layer and a compressed padding layer bonded together according to an implementation of the disclosure.

FIG. 2 illustrates a drive member 1 including a backing layer 2 and a compressed padding layer 3 bonded together according to an implementation of the disclosure. During manufacture of drive member 1, padding layer 3 may be compressed by external pressing forces applied from opposite directions along the second dimension towards a center of padding layer 3 such that padding layer 3 is compressed along the second dimension to match the first length of backing layer 2, and then the first surface of padding layer 3 may be bonded to the first surface of backing layer 2 in a manner of matching lengths. The first surface of padding layer 3 can be bonded to the first surface of backing layer 2 using any suitable physical or chemical bonding methods that may securely bond padding layer 3 to backing layer 2. Examples of bonding methods may include using adhesive agents or heat-based bonding process.

Figure 3:
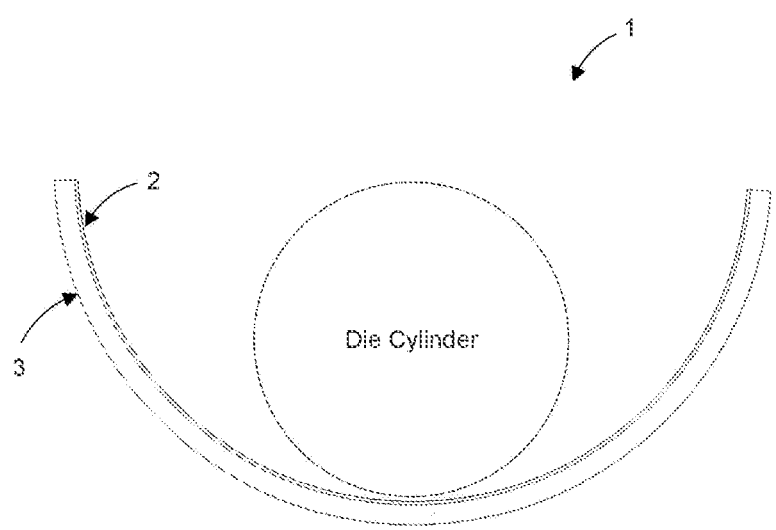
FIG. 3 illustrates the drive member bent around a die cylinder according to an implementation of the disclosure.

As shown in FIG. 2, after the bonding between padding layer 3 and backing layer 2 is cured (i.e., padding layer 3 and backing layer 2 is securely bonded together), the length of the first surface of padding layer is compressed to the same length as the first surface of backing layer. The second surface of padding layer 3 is free from any bonding and is thus relaxed. In this situation, the length of the second surface of padding layer 3 may be longer than the length of its first surface. Therefore, when drive member 2 is bent to conform to the contour of the die cylinder as shown in FIG. 3, the second surface (i.e., the outer surface) of padding layer 3 is not fully stretched and thus less rigid on its surface. The less rigid outer surface of padding layer 3 may generate less counter force during a dummy run which may reduce the negative impact on the magnetic binding between backing layer 2 and the die cylinder.

To this end, in one implementation, the first length of padding layer in its uncompressed state is at least two (2) percent longer than the first length of the backing layer or at least five (5) percent longer than the first length of the backing layer to ensure a relaxed second surface of padding layer 3. The percentages are determined as the extra length over the first length of backing layer. Alternatively, the extra length of padding layer 3 over backing layer 2 may be determined based on the thickness (T2) of padding layer 3. For example, the extra length may be more than or equal to the thickness (T2). This may ensure that when bent, the second surface of padding layer 3 is still not stretched to be rigid.

Figure 4:
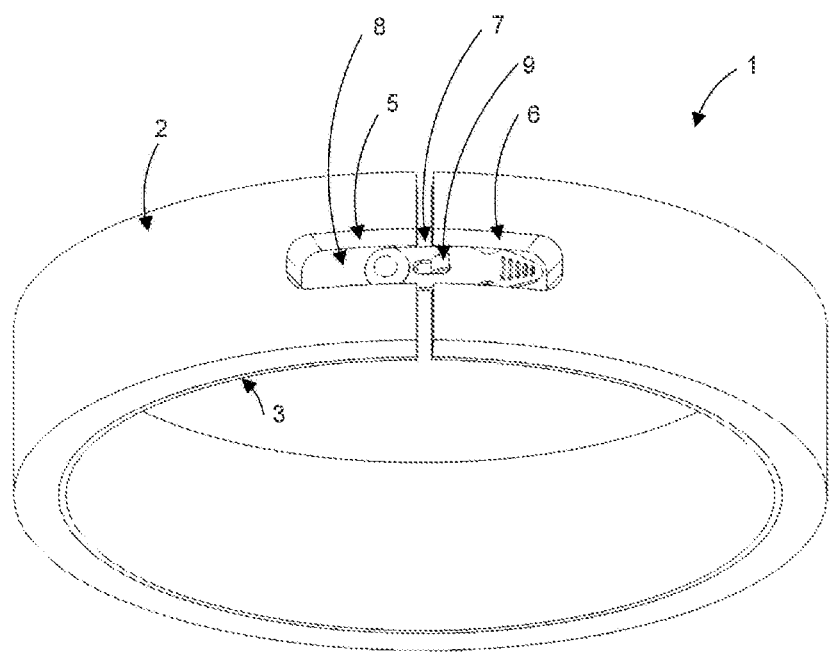
FIG. 4 illustrates a drive member including a fastener device in an engaged position according to an implementation of the disclosure.

The first length of backing layer 2 may match the circumference of the die cylinder so that driver member 1 may be wrapped fully onto the die cylinder. This may eliminate the need to time the contact between drive member 1 and the feeding of the sheet of workpieces. In one implementation, to further strengthen the binding of drive member 1 onto the die cylinder, drive member 1 may include a fastener device. Referring to FIGS. 1A-1B and FIG. 4, padding layer 3 may have a certain length (L2 inches at the uncompressed state) that is terminated along the second dimension by a first end surface and a second end surface. Further, padding layer 3 may include a first recess channel 5 with an outlet to the first end surface, and a second recess channel 6 with an outlet to the second end surface. First recess channel 5 and second recess channel 6 can be open spaces carved out of padding layer 3 for installation of a fastener device 7. In one implementation, the open spaces have a height that matches the full thickness (T2) of padding layer 3. In another implementation, the open spaces have a height that is less than the full thickness (T2) of padding layer 3. In both implementations, when drive member 2 is bent so that the first end surface and the second end surface meet, the outlet of first recess 5 channel is to match the outlet of second recess channel 6.

Fastener device 7 may include a tab 8 fixedly attached to one or both of backing layer 2 and padding layer 3 within the first recess channel 5. Tab 8 can be an elastic strip (e.g., a plastic strip) having an opening hole therein. Tab 8 may be fixed to backing layer 2 and/or padding layer 3 using a rivet. In one implementation, a thin steel washer (e.g., about 0.01 inch thick) is provided on the bottom side of the magnet. The steel washer can reduce the chance that the rivet is torn out of the rubber magnet layer. Fastener device 7 may further include a hook 9 fixedly attached to one or both of backing layer 2 and padding layer 3 within the second recess channel 6. Hook 9 can be a plastic hook or a metal hook for engaging with the opening in tab 8. Hook 9 may be fixed to backing layer 2 and/or padding layer 3 using another rivet. During operation, driver member 1 may be wrapped all the way around the circumference of the die cylinder, and tab 8 may be coupled to hook 9. In this way, drive member 1 may be bound to the magnetic force between the magnetic material of backing layer 2 and the die cylinder. Additionally, the magnetic binding is further strengthened by fastener device 7, resulting more secured binding between drive member 1 and the die cylinder.

In one implementation, the thickness of padding layer 3 is uniformly identical at any point on the first surface or the second surface of padding layer 3 except for areas defining the first recess channel and the second recess channel. The second surface of the padding layer is smooth and frictional. Compared to those non-uniform thickness drive members, the molding process of padding layer 3 is much simpler, thus significantly reducing the production cost of drive member 1.

The drive member 1 as described above may be installed on a die cylinder of a die machine. In this disclosure, the die machine without limitation refers to any machine including a rotating cylinder (i.e., the die cylinder). In some implementations, the die machine may include a motor, an anvil cylinder, and a die cylinder for receiving the installation of drive member 1. During operation, the motor of the die machine may be activated to drive the anvil cylinder and the die cylinder to rotate in opposition directions. The sheet of workpiece is fed manually or automatically to the gap between the rotating anvil cylinder and the rotating die cylinder installed thereon with the drive member. The outer surface of the padding layer of the drive member is to make a contact with the sheet of workpiece, and a frictional force generated by the second surface of the padding layer of the driver member is to drive the sheet of workpiece through the die machine without causing modification to the sheet of workpiece.

Figure 5:
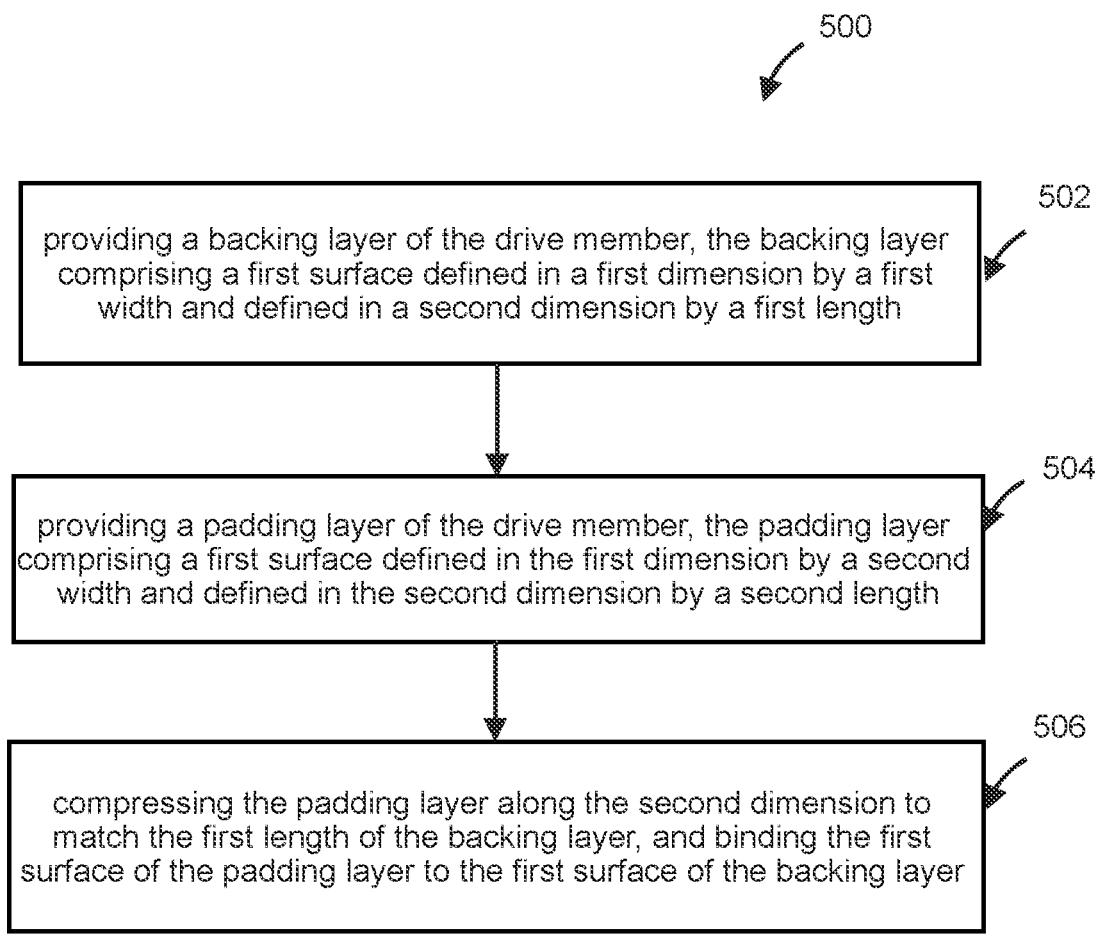
FIG. 5 illustrates a process for providing a drive member according to an implementation of the present disclosure.

FIG. 5 illustrates a process 500 for providing a drive member according to an implementation of the present disclosure. At 502, the method may include providing a backing layer of the drive member, the backing layer comprising a first surface defined in a first dimension by a first width and defined in a second dimension by a first length.

At 504, the method may further include providing a padding layer of the drive member, the padding layer comprising a first surface defined in the first dimension by a second width and defined in the second dimension by a second length, where the padding layer is composed of a compressible foam material, and in an uncompressed state of the padding layer, the second length of the padding layer is longer than the first length of the backing layer.

At 506, the method may include compressing the padding layer along the second dimension to match the first length of the backing layer, and bonding the first surface of the padding layer to the first surface of the backing layer.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "an embodiment" or "an implementation" or "one implementation" throughout is not intended to mean the same embodiment or implementation unless described as such.

Reference throughout this specification to "an embodiment" or "an embodiment" means that a particular feature, structure, or characteristic described in connection with the embodiment is included in at least an embodiment. Thus, the appearance of the phrases "in an embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method for making a drive member, comprising: providing a backing layer of the drive member, the backing layer comprising a first surface defined in a first dimension by a first width and defined in a second dimension by a first length;
   providing a padding layer of the drive member, the padding layer comprising a first surface and a second surface that is opposite to the first surface, wherein the padding layer is composed of a compressible foam material and is defined in the first dimension and in the second dimension; and
   compressing the padding layer along the second dimension to match the first length of the backing layer, and bonding the first surface of the padding layer to the first surface of the backing layer, wherein a first length of the first surface of the padding layer in the second dimension equals to the first length of the backing layer, and the second surface of the padding layer is free from bonding, and a second length of the second surface of the padding layer in the second dimension is greater than the first length of the backing layer.

2. The method of claim 1, wherein the backing layer comprises a second surface that is matched to and substantially parallel to the first surface of the backing layer, and wherein the padding layer comprises a second surface that is matched to and substantially parallel to the first surface of the padding layer, and a thickness of the padding layer is defined as a distance between the first surface and the second surface of the padding layer.

3. The method of claim 2, wherein the padding layer is terminated along the second dimension by a first end surface and a second end surface, and wherein the padding layer comprises a first recess channel with an outlet to the first end surface, and a second recess channel with an outlet to the second end surface.

4. The method of claim 3, further comprising:
   providing a fastener device comprising a tab fixedly attached in the first recess channel to at least one of the backing layer or the padding layer, and a hook device fixedly attached in the second recess channel to at least one of the backing layer or the padding layer, wherein when the drive member is bent so that the first end surface and the second end surface meet, the outlet of the first recess channel is to match the outlet of the second recess channel.

5. The method of providing the drive member of claim 1, further comprising:
   mounting the drive member to a cylinder of a machine by securing the tab onto the hook device so that the first end surface and the second end surface meet, and the second surface of the backing layer forms a curved surface that matches to the cylinder of the machine.

6. The method of claim 1, wherein the backing layer is composed of a sheet of one of magnetic steel or magnetic rubber, and wherein the padding layer is composed of polyurethane foam.

7. A drive member for driving a sheet of workpiece through a machine, comprising:
   a backing layer comprising a first surface defined in a first dimension by a first width and defined in a second dimension by a first length; and
   a padding layer comprising a first surface and a second surface that is opposite to the first surface, wherein the padding layer is composed of a compressible foam material and is defined in the first dimension and in the second dimension,
   wherein
   the first surface of the padding layer is bonded to the first surface of the backing layer, and a first length of the first surface of the padding layer in the second dimension equals to the first length of the backing layer, and the second surface of the padding layer is free from bonding, and a second length of the second surface of the padding layer in the second dimension is greater than the first length of the backing layer.

8. The drive member of claim 7, wherein the backing layer is composed of a sheet of one of magnetic steel or magnetic rubber, and wherein the padding layer is composed of one of natural rubber or synthetic rubber, the synthetic rubber including at least one of polyurethane, ethylene propylene diene monomer (EPDM), polychloroprene (neoprene), or blended flexible compound synthetic rubber.

9. The driver member of claim 7, wherein the padding layer is in a natural state without receiving an external force to compress or expand the padding layer along the second dimension of the padding layer.

10. The drive member of claim 7, wherein the padding layer and the backing layer are curved with the backing layer providing an inward layer and the padding layer providing an outward layer of the drive member.

11. The drive member of claim 7, wherein the backing layer comprises a second surface that is matched to and substantially parallel to the first surface of the backing layer, and wherein the second surface of the padding layer is matched to and substantially parallel to the first surface of the padding layer, and a thickness of the padding layer is defined as a distance between the first surface and the second surface of the padding layer.

12. The drive member of claim 11, wherein the padding layer is terminated along the second dimension by a first end surface and a second end surface, and wherein the padding layer comprises a first recess channel with an outlet to the first end surface, and a second recess channel with an outlet to the second end surface.

13. The drive member of claim 12, further comprising a fastener device comprising an elastic tab fixedly attached in the first recess channel to at least one of the backing layer or the padding layer, and a hook device fixedly attached in the second recess channel to at least one of the backing layer or the padding layer, wherein when the drive member is bent so that the first end surface and the second end surface meet, the outlet of the first recess channel is to match the outlet of the second recess channel.

14. The drive member of claim 13, wherein the machine is a die machine, and wherein when the drive member is bent so that the first end surface and the second end surface meet, the tab is secured to the hook device of the fastener device so that the second surface of the backing layer forms a curved surface that matches to a die cylinder of the die machine.

15. The drive member of claim 12, wherein the thickness of the padding layer is uniformly identical at any point on the first surface or the second surface of the padding layer except for areas defining the first recess channel and the second recess channel.

16. The drive member of claim 11, wherein the second surface of the padding layer is smooth and frictional.

17. The drive member of claim 7, wherein in a uncompressed state of the padding layer, the second length of the padding layer is one of at least two (2) percent longer than the first length of the backing layer or at least five (5) percent longer than the first length of the backing layer.

18. A die machine, comprising a motor, an anvil cylinder, and a die cylinder installed thereon with the drive member of claim 7.

19. The die machine of claim 18, wherein the motor is activated to drive the anvil cylinder and the die cylinder to rotate in opposition directions, wherein the sheet of workpiece is provided to a gap between the rotating anvil cylinder and the rotating die cylinder installed thereon with the drive member, and wherein the second surface of the padding layer of the drive member is to contact the sheet of workpiece and a frictional force generated by the second surface of the padding layer of the driver member is to drive the sheet of workpiece through the die machine without causing modification to the sheet of workpiece.

20. A speed strap, comprising:
- a backing layer comprising a first surface area and a second surface area, each of the first surface area and the second surface area of the backing layer being defined by a first width and a first length;
- a padding layer being composed of compressible foam material, the padding layer comprising a first surface area, a second surface area that is opposite to the first surface area, a first side surface area, and a second side surface area, wherein the first side surface area terminates the first surface area and the second surface area at a first end, the second side surface area terminates the first surface area and the second surface area at a second end, wherein the padding layer is provided with a first recess channel with an outlet on the first side surface area and a second recess channel with an outlet on the second side surface area, wherein the first surface area of the padding layer is bonded to the first surface area of the backing layer, and wherein the first surface area of the padding layer is bonded to the first surface area of the backing layer, a length of the first surface area along a dimension is same as the first length of the backing layer, and the second surface area of the padding layer is free from bonding, and a length of the second surface area along the dimension is greater than the first length of the backing layer; and
- a fastener comprising a tab fixedly attached in the first recess channel to at least one of the backing layer or the padding layer, and a hook fixedly attached in the second recess channel to at least one of the backing layer or the padding layer.

* * * * *